Feb. 7, 1950   J. E. LYLE   2,496,481
COLTER MOUNTING
Filed Dec. 13, 1946
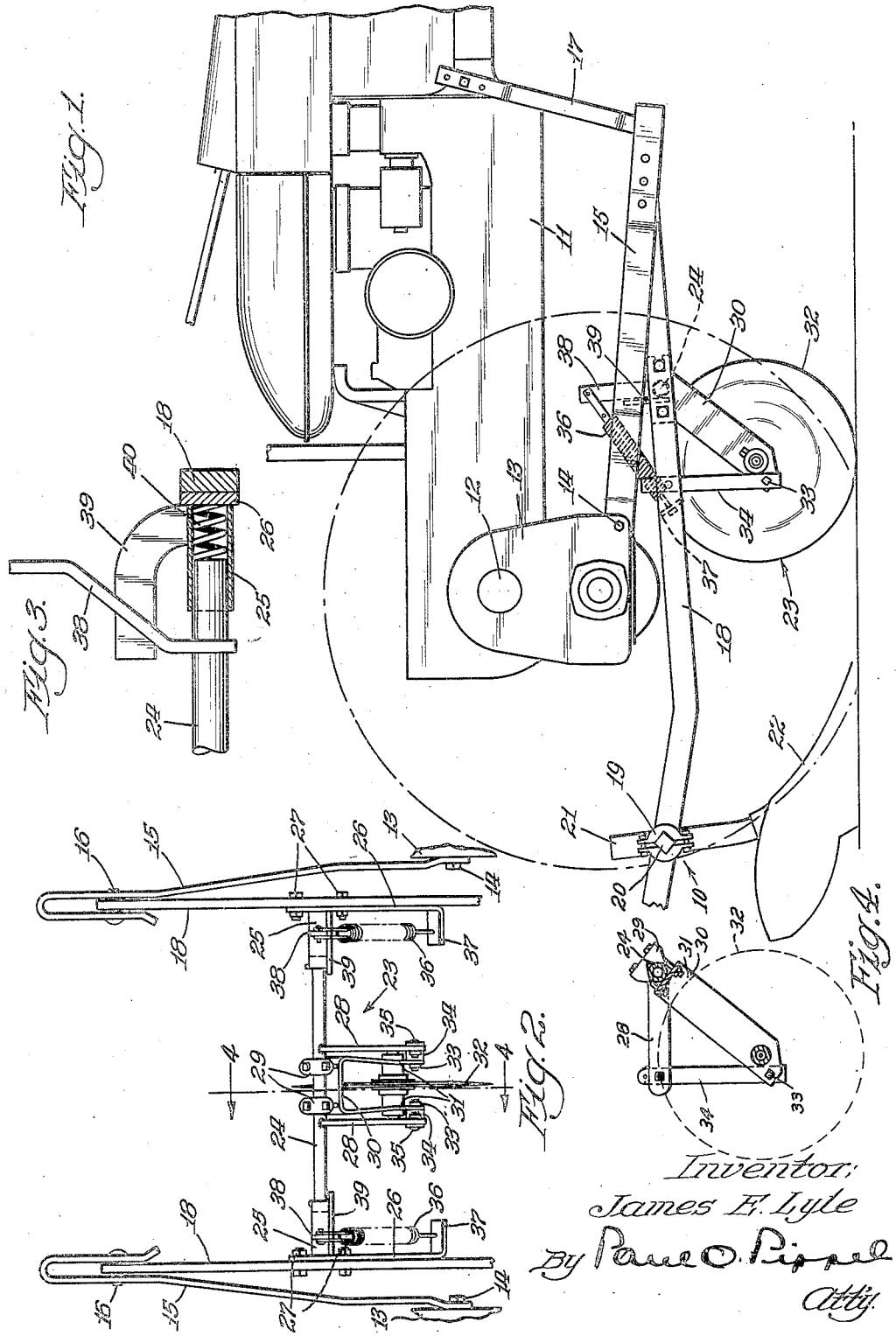
Inventor:
James E. Lyle
By Paul O. Pippel
Atty.

Patented Feb. 7, 1950

2,496,481

UNITED STATES PATENT OFFICE 2,496,481

COLTER MOUNTING

James E. Lyle, Canton, Ill., assignor to International Harvester Company, a corporation of New Jersey Application December 13, 1946, Serial No. 715,957

5 Claims. (Cl. 97—209)

This invention relates to agricultural implements and particularly to earth working implements utilizing auxiliary soil penetrating devices to facilitate their operation. More specifically, the invention concerns a novel mounting for a colter assembly.

With tillage tools such as plows, middle busters, and the like, it is customary at certain times and in certain types of soil to provide a colter such as a rolling colter in the form of a disc blade in advance of the plow or other tool to penetrate the soil in advance of the tillage tool. In territories where cane is grown, it is customary to provide a tool of the middle buster type to open a furrow, the middle buster being flanked by angularly arranged discs to throw inwardly the dirt which has been broken by the middle buster. In such an implement a colter is usually provided in advance of the middle buster and it is frequently damaged by contact with obstructions such as roots and the like.

An important object of the present invention is therefore to provide means by which damage to a soil penetrating tool such as a rolling colter may be avoided during operation of the implement with which the colter is associated.

Another object of the invention is to provide in an agricultural implement a novel mounting for a colter or other earth contacting tool which will accommodate movement of the colter in a direction to avoid obstacles encountered during operation of the implement.

A further object of the invention is to provide in an agricultural implement an improved colter mounting which will accommodate both lateral and vertical movement of the colter in order to avoid injury thereto by obstacles encountered during operation, and means for returning the colter to its normal operating position with respect to the earth working member.

Another object of the invention is to provide in an agricultural implement a novel mounting for a colter or the like in which the colter is capable of shifting laterally to opposite sides of a normal neutral position against the action of springs tending to return the colter to its operating position. Springs are likewise provided for holding the colter to its work but yieldable to accommodate vertical swinging of the colter in order to avoid obstacles.

Other objects and advantages of the invention will become clear from the following detailed description when read in conjunction with the accompanying drawings, wherein:

Figure 1 is a view in side elevation showing the rear portion of a tractor having connected thereto an implement of the cane tool type embodying the features of the present invention. Only a portion of the cane tools are shown upon the implement, it being understood that such tools per se are conventional and form no part of this invention;

Figure 2 is a plan view of a portion of the structure shown in Figure 1 and showing the manner in which the implement is attached to the tractor;

Figure 3 is a detail in section showing a portion of the mechanism by which the colter is mounted upon the implement; and Fig. 4 is a sectional view taken on the line 4—4 of Fig. 2.

Referring to the drawings, the implement embodying the features of the present invention is designated by the numeral 10 and is mounted upon a tractor having a body portion 11, a transverse rear axle 12, and depending axle housings 13 at each side of the tractor body.

These depending housings 13 provide a mounting at 14 for one end of a pair of forwardly extending members 15, each of which is bent back upon itself at its forward end to provide a seat for a pivot pin 16. The forward end of each of the members 15 is likewise secured to the lower end of a strap 17, one of which is provided on each side of the tractor body and affixed thereto.

The pivot pins 16 at the forward end of the members 15 serve for the pivotal mounting of the forward ends of laterally spaced longitudinally extending beams 18, the rear ends of which are provided with clamps 19 for securing to the beams a transversely extending tool bar 20 upon which is mounted centrally thereof between the beams 18 a generally vertically extending standard 21, to the lower end of which is secured an earth working tool in the form of a middle buster 22.

In order to penetrate the soil in advance of the tool 22 and open a path therefore, a colter assembly generally indicated at 23 is provided. The colter assembly 23 includes a transversely extending rotatable shaft member 24 having its ends received in bearing or socket members 25 which are secured to brackets 26 affixed by bolts 27 to the respective beams 18.

A pair of laterally spaced arms 28 are affixed, as by welding, to the shaft member 24 and extend rearwardly therefrom. Likewise secured to the shaft member 24 by clamps 29 is a U-shaped member 30 having rearwardly and downwardly extending arms 31 having rotatably mounted between the lower ends thereof a colter 32. The ends of the arms 31 extending beyond the colter mounting are apertured and have secured thereto by bolts 33 the lower ends of a pair of straps 34, the upper ends of which are secured to the extremities of arms 28 by bolts 35. The colter unit is thus rigidly secured to the shaft member 24 and is capable of swinging generally vertically when obstacles are encountered.

The shaft member 24 is capable of rocking movement in the bearings 25 and is restrained against upward swinging by springs 36, each of which is connected at one end to an angled portion 37 of the respective bracket 26 and its other end is connected to an arm 38 secured to and extending upwardly from the shaft 24, one such arm being provided near each end of the shaft. Downward movement of the colter unit is limited by engagement of the arms 38 with stop members 39 secured to the brackets 26.

As pointed out before, the shaft member 24 is slidable in the sockets 25 so that the entire shaft with its colter unit mounted thereupon is movable in a straight line laterally from one side to the other of a normal neutral operating position of the colter. This movement, however, is yieldably opposed by springs 40, one of which is provided in each of the sockets 25 as illustrated in Figure 3. Each end of the shaft 24 thus engages a spring 40, so that when an obstacle is encountered by the colter blade 32 it is capable of yielding laterally against the action of the springs 40. These springs are, of course, compressed by the thrust exerted by shaft 24 and tend to keep the shaft with its colter mounting centered with respect to the earth working tool.

From the foregoing description it should be clear that a novel mounting has been provided for a soil penetrating tool such as a colter whereby both vertical and lateral movements of the colter are accommodated to permit the colter to avoid obstacles which it encounters, and prevent damage thereto. It is believed that the operation of the colter will be fully understood from the foregoing description. It may be likewise understood that the invention has been described in its preferred embodiment and that modifications may be made therein without departing from the spirit of the invention or the scope of the appended claims.

What is claimed is:

1. In an agricultural implement or the like, a support, an earth-working tool carried by the support, a ground-engaging device for operation in conjunction with the earth-working tool, and means for mounting said device on the support, comprising an axle member mounted on the support for rocking movement about a transverse axis and laterally movable relative to said tool, yieldable means engaging said axle member and opposing lateral movement thereof, an arm on the member for carrying the ground-engaging device at a location removed from the axis of the member for generally vertical swinging movement upon rocking of the member, and resilient means connected between the member and the support for opposing rocking of the member in one direction.

2. In an agricultural implement, a frame, an earth-working tool carried by the frame, laterally spaced bearings carried by the frame, a member having its ends slidably and rotatably received in said bearings, an arm on the member, a colter carried by the arm for swinging movement in a vertical plane upon rocking of the member, resilient means resisting upward swinging of the colter, and yieldable means resisting sliding movement of the member in said bearings.

3. In an agricultural implement, a frame, an earth-working tool carried by the frame, laterally spaced bearings carried by the frame, a member having its ends slidably and rotatably received in said bearings, an arm on the member, a colter carried by the arm for swinging movement in a vertical plane upon rocking of the member, resilient means resisting upward swinging of the colter, and spring means in said bearings engageable with the ends of said member for resisting sliding movement thereof in the bearings.

4. A tractor mounted agricultural implement comprising a transverse tool bar, an earth-working tool carried by the tool bar, laterally spaced beams secured to said tool bar and extending forwardly therefrom, means pivotally connecting the forward ends of said beams to the tractor for generally vertical swinging movement, a colter assembly arranged to travel in advance of the earth-working tool and penetrate the soil to be traversed thereby, said assembly including a socket member on each said beam, a transversely extending rockable shaft member having its ends slidably received in said sockets for lateral movement with respect to the beams and said earth-working tool, arms on said shaft member, a colter blade carried by said arms for vertical swinging movement upon rocking of the shaft member, spring means yieldably resisting upward movement of the colter, and resilient means yieldably opposing lateral movement of the shaft member in said sockets.

5. A tractor mounted agricultural implement comprising a transverse tool bar, an earth-working tool carried by the tool bar, laterally spaced beams secured to said tool bar and extending forwardly therefrom, means pivotally connecting the forward ends of said beams to the tractor for generally vertical swinging movement, a colter assembly arranged to travel in advance of the earth-working tool and penetrate the soil to be traversed thereby, said assembly including a socket member on each said beam, a transversely extending rockable shaft member having its ends slidably received in said sockets for lateral movement with respect to the beams and said earth-working tool, arms on said shaft member, a colter blade carried by said arms for vertical swinging movement upon rocking of the shaft member, spring means yieldably resisting upward movement of the colter, a stop limiting downward movement of the colter relative to the earth-working tool, and springs in said sockets engageable with the ends of said shaft member to yieldably oppose lateral movement thereof in said sockets.

JAMES E. LYLE.

REFERENCES CITED

The following references are of record in the file of this patent:

UNITED STATES PATENTS

| Number | Name | Date |
|---|---|---|
| 2,210,813 | Kriplean | Aug. 6, 1940 |
| 2,324,064 | Coffing | July 13, 1943 |